United States Patent [19]

Umeda et al.

[11] Patent Number: 5,095,376

[45] Date of Patent: Mar. 10, 1992

[54] APPARATUS AND METHOD FOR DRIVING AN OPTICAL PRINTER HAVING A LIQUID CRYSTAL OPTICAL SWITCH

[75] Inventors: Takao Umeda, Mito; Tetsuya Nagata, Hitachi; Tatsuo Igawa, Kitaibaraki, all of Japan

[73] Assignee: Hitachi, Ltd., Tokyo, Japan

[21] Appl. No.: 556,580

[22] Filed: Jul. 24, 1990

Related U.S. Application Data

[63] Continuation of Ser. No. 244,064, Sep. 14, 1988, abandoned.

[30] Foreign Application Priority Data

Sep. 14, 1987 [JP] Japan .................. 62-228641

[51] Int. Cl.$^5$ .................................. G02F 1/13
[52] U.S. Cl. ......................... 359/56; 340/784
[58] Field of Search .............. 350/332, 350 S, 333, 350/331 R; 355/81, 211, 234; 340/784, 767; 346/160

[56] References Cited

U.S. PATENT DOCUMENTS

| | | | |
|---|---|---|---|
| 4,508,429 | 4/1985 | Nagae et al. | 350/350 S |
| 4,591,886 | 5/1986 | Umeda et al. | 346/160 |
| 4,614,954 | 9/1986 | Ohta et al. | 350/333 X |
| 4,701,026 | 10/1987 | Yazaki et al. | 350/333 |
| 4,746,196 | 5/1988 | Umeda et al. | 350/333 |
| 4,769,659 | 9/1988 | Umeda et al. | 350/350 S X |
| 4,770,502 | 9/1988 | Kitazima et al. | 350/350 S |
| 4,958,912 | 9/1990 | Inaba et al. | 350/333 |

Primary Examiner—John S. Heyman
Assistant Examiner—Huy K. Mai
Attorney, Agent, or Firm—Antonelli, Terry, Stout & Kraus

[57] ABSTRACT

An apparatus and method for driving an optical printer having at least one liquid crystal optical switch including a ferroelectric liquid crystal layer interposed between a pair of substrates having electrodes on confronting surfaces thereof, the at least one liquid crystal switch being disposed between a light source and a photosensitive surface, a light transmission state of the at least one liquid crystal optical switch being controlled by application of a voltage signal to the at least one liquid crystal optical switch so as to control light transmission to the photosensitive surface. A first voltage signal is applied to the liquid crystal of at least one liquid crystal optical switch in a writing period in which the light transmission state is determined in accordance with a printing signal for printing. A second voltage signal having a DC component of one polarity is applied to the liquid crystal layer in a retention period. A third voltage signal having a DC component of an opposite polarity is applied to the liquid crystal layer in a reset period in which the at least one liquid crystal optical switch is placed in a light interrupting state, and a fourth voltage signal having a DC component of the one polarity is applied to the liquid crystal layer in a period other than an excluding period which is formed of the writing period, the retention period and the reset period.

22 Claims, 7 Drawing Sheets

APPARATUS AND METHOD FOR DRIVING AN OPTICAL PRINTER HAVING A LIQUID CRYSTAL OPTICAL SWITCH

This application is a continuation of application Ser. No. 244,064, filed Sept. 14, 1988, now abandoned.

BACKGROUND OF THE INVENTION

This invention relates to an apparatus and method for driving an optical printer having at least one liquid crystal optical switch using a ferroelectric liquid crystal and which enables obtaining a high contrast.

Figure 2A:
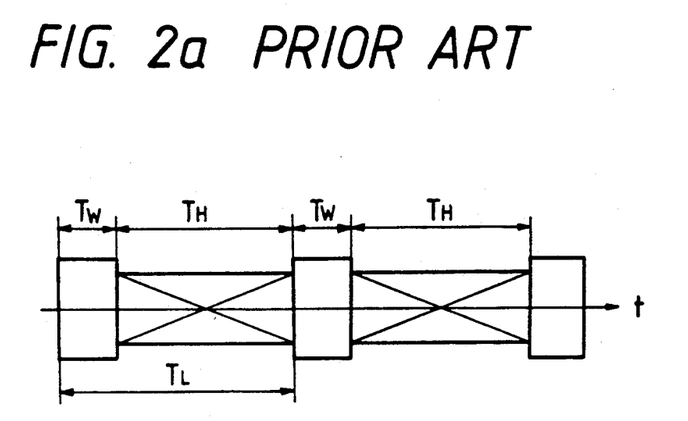
FIGS. 2a and 2b are diagrams showing a conventional optical switch driving method and the waveforms of the transmitted light.
Figure 2B:
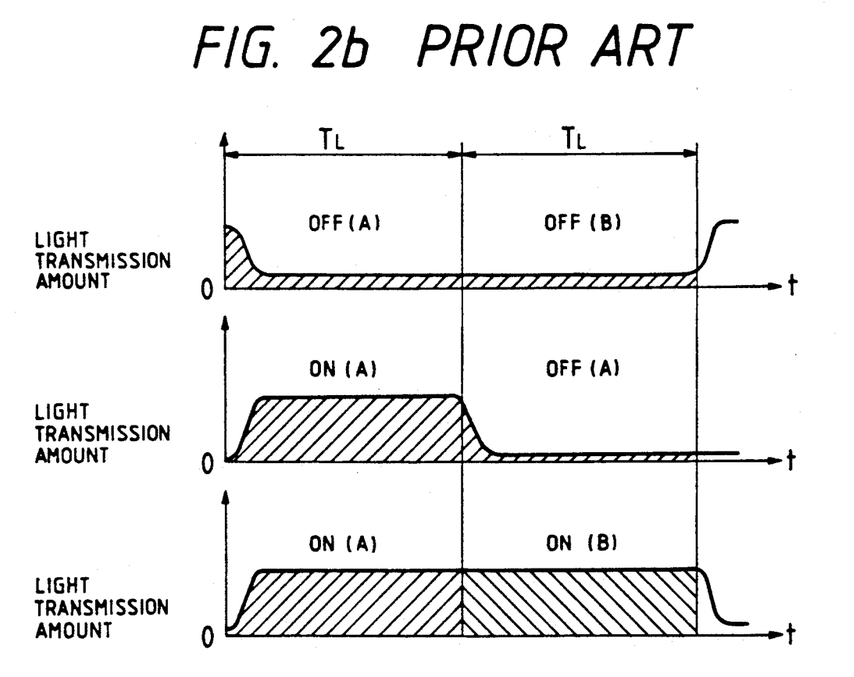

In a conventional method of driving a ferroelectric liquid crystal optical switch array disclosed in U.S. Pat. No. 4,508,429, U.S. Pat. No. 4,591,886, U.S. Pat. No. 4,712,876 and U.S. Pat. No. 4,655,561, one frame term $T_L$ consists of a writing period $T_W$ for determining the light transmission state and a retention period $T_H$ (non-selection period in a time sharing driving operation) as shown in FIG. 2a. It takes about 0.1-0.5 ms for the liquid crystal molecules to respond to the applied voltage signal. Accordingly, the light transmission waveforms in ON state and OFF state in one frame term become as shown in FIG. 2b. The light transmission waveform OFF(A) represents a change of a light transmitting term into a light interrupting term, the light transmission waveform OFF(B) represents a change of a light interrupting term into a light interrupting one, the waveform ON(A) represents a change of a light interrupting term into a light transmitting term, and the light transmission waveform ON(B) represents a change of a light term into a light transmitting term. Thus, these light transmission waveforms have two kinds of waveforms, the light transmission states (ON) and light interrupting state (OFF) having different light transmission amounts (which are proportional to the areas of the hatched portions of FIG. 2b) respectively in one frame term. Out of these periods, the period ON(B) has a maximum light transmission amount. In the OFF periods, the light transmission amount of the period OFF(A) becomes higher. Consequently, the contrast ratio, i.e. the value of (light transmission amount in the ON periods) / (light transmission amount in the OFF periods) is not uniform. The contrast ratio is improved by reducing the light transmission amount in the period OFF(A). In this method, if the last period of one frame term is always put in the light interrupting state, the initial light transmission in the period OFF(A) can be eliminated.

The present inventors proposed a similar operation in U.S. Pat. No. 4,746,196 entitled "Multiplexed driving method for an optical switching element employing ferroelectric liquid crystal".

Figure 3:
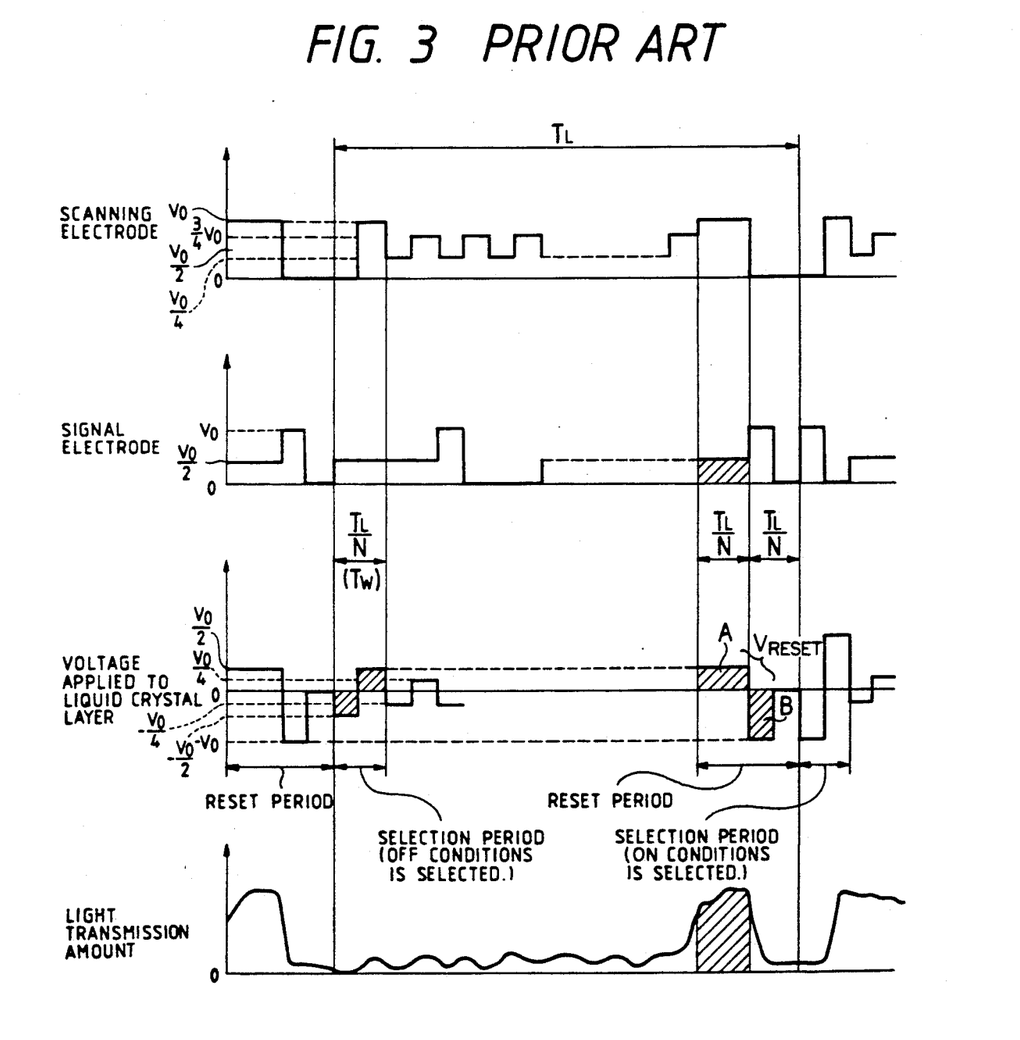
FIG. 3 shows waveforms of a conventional method of driving a ferroelectric liquid crystal display.

A time sharing driving method for a ferroelectric liquid crystal display panel, which has a writing reset period and a period in which the light transmission state of the reset is retained or reversed to select light transmitting state, is known (Japanese Patent Laid-Open No. 56937/1987). FIG. 3 shows the voltages at the scanning electrodes, the voltage at the signal electrodes and a voltage representing a difference between these two voltages, that is to say, which is an applied voltage to a liquid crystal layer, and a waveform of the relative transmitted light in this driving method. In a reset period 2 $T_L/N$ (wherein N is the number of time division; and $T_L$ is one frame term), a reset voltage signal $V_{reset}$ for obtaining a reset state (light interrupting state) is applied. This voltage signal consists of a combination of a pair of voltage pulses, i.e. $+V_0/2$ (portion A) in the first half $T_L/N$ of the reset period and $-V_0$ (portion B) in the latter half $T_L/(2N)$ so that an average voltage in the reset period become substantially zero. Owing to this reset period, the contrast can be improved. Unless an average voltage in the reset period becomes substantially zero, the liquid crystal material is deteriorated, and this is why such a reset voltage is used.

In the above-described driving method, the voltage $+V_0/2$ (portion A in FIG. 3) is applied in the reset period, so that light is transmitted even in an OFF period. In case of a display, the number of time division is as large as several hundred, and the reset period substantially becomes shorter, so that such a degree of leakage of the light during the OFF period is negligible. However, in case of a liquid crystal optical switch for a printer, in which the number of time division is around ten at largest, the leakage amount of the light in one frame term becomes relatively high. This causes the contrast ratio to decrease, and the quality of the printed materials of the printer to become low. Therefore, this driving method cannot be adopted as the liquid crystal optical switch for a printer.

SUMMARY OF THE INVENTION

An object of the present invention is to provide an apparatus and method of driving a liquid crystal optical switch for a printer, capable of attaining a high contrast ratio by preventing the leakage of the light during the reset period.

This object can be achieved by using a DC voltage signal of one polarity, which selects the light interrupting state, as a reset voltage, and applying a DC voltage of the opposite polarity to the liquid crystal switch at least a period except for the reset period, for example, the retention period or after a printing operation.

The other objects and characteristic features of the present invention will become apparent from the following description of the preferred embodiments.

DESCRIPTION OF THE PREFERRED EMBODIMENTS

Figure 1A:
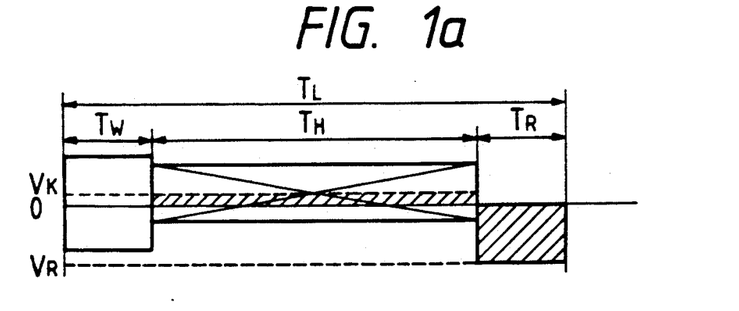
FIGS. 1a-1c are diagrams showing the principle of the present invention.
Figure 1B:
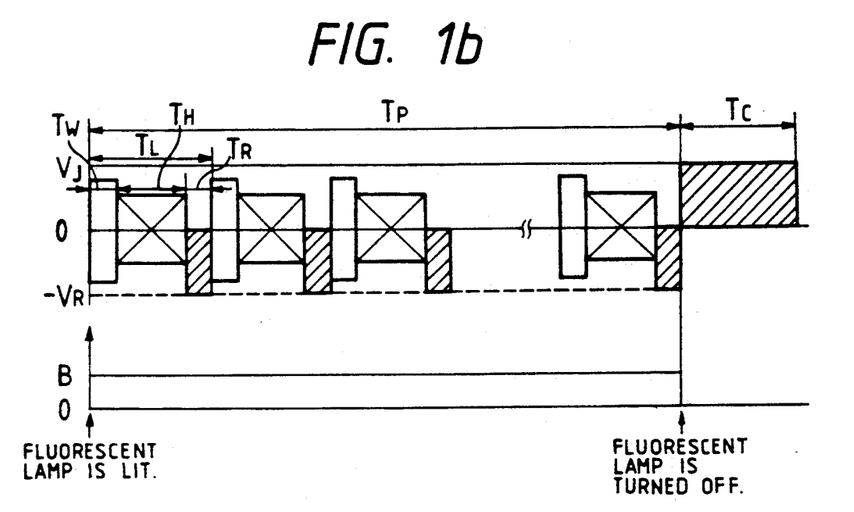
Figure 1C:
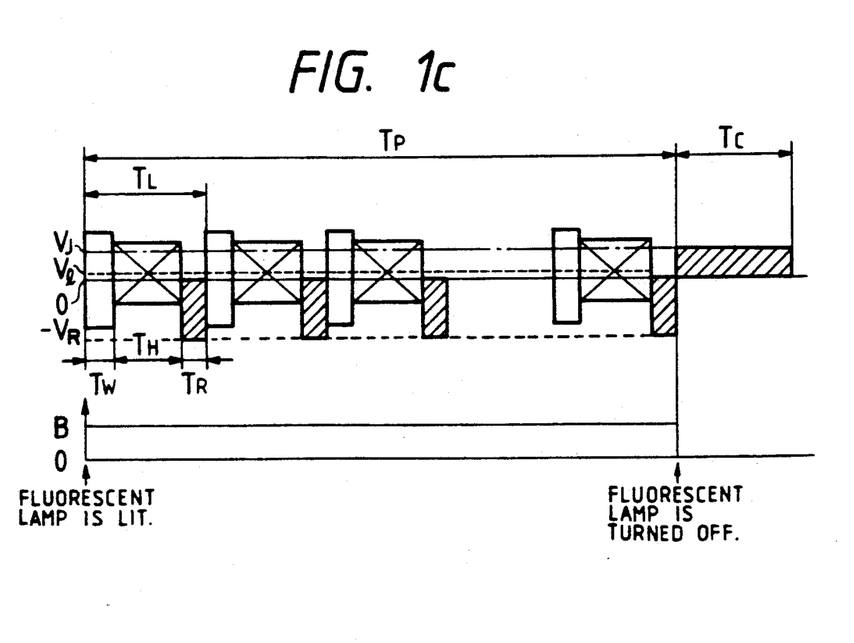

FIGS. 1a1c show the principles of operation of the present invention. Referring to FIG. 1a, a negative DC voltage signal having an amplitude value of $+V_R$ is applied only in a reset period to obtain a light interrupting state. In this embodiment, a voltage of a negative polarity is utilized to obtain a light interrupting state.

However, a liquid crystal optical switch obtains a light interrupting state when a voltage signal of a negative polarity is applied, and a light transmitting state is obtained when a voltage signal of a positive polarity is applied. Additionally, a DC voltage component $V_K$ is applied as a bias voltage to a non-selected voltage signal electrode during the retention period $T_H$. The amplitude of $V_K$ is expressed by $V_R \cdot T_R/T_H$, for example, the retention period or after a printing operation may have a step voltage value as long as it has a waveform having a positive DC voltage component corresponding to $V_R \cdot T_R$.

The $V_K \cdot T_H$ may be not more than $V_R \cdot T_R$ as long as it has a bias voltage of a positive polarity that does not substantially deteriorate a ferroelectric liquid crystal and can reduce the DC component. When $V_K$ is applied, the complete light interrupting condition is obtained during the reset period, and a high contrast can be attained. This DC voltage is substantially converted into AC voltage to reduce the DC component in one frame term and preferably enables the average DC component of the voltage signal to be set to substantially zero, so that the deterioration of the liquid crystal material does not occur. When the number of time division $N(=T_L/T_R)$ increases, $T_R/T_H$ becomes smaller, so that $V_K$ also becomes smaller. Accordingly, the influence of $V_K$ upon the liquid crystal molecules during the retention period also decreases.

In the example of FIG. 1b, the amplitude of $V_K$ is zero. The average DC component of the voltage signal during one frame term is not set to zero. However, a DC voltage of a positive polarity, which is opposite to the polarity of the DC component applied during the printing operation, is applied collectively after a printing operation has been completed and/or before a printing operation starts to reduce the DC component and preferably set the average DC voltage component to substantially zero. $T_P$ is designated to be the time required to print at least one sheet of paper, the number of frames becomes $T_P/T_L$. Therefore, the unbalance of DC component of a negative polarity corresponding to $V_R \cdot T_R(T_P/T_L)$ occurs during the printing of at least one sheet of paper. In order to reduce this unbalance, a voltage $V_R'$ is applied for the time $T_C$ after the printing has been completed in this embodiment. The time $T_C$ above is substantially equal to $V_R T_R T_P/(V_R' T_L)$. Since a fluorescent lamp, which is utilized as a light source for the optical printer is turned off immediately after the printing operation has been completed, the light is not transmitted, and the printing operation is not influenced by the light. In this method, the bias component $V_K$ is not applied during the retention period, so that the method has an excellent retaining effect.

FIG. 1c shows a method of applying a voltage in a divided manner, i.e., in the period $T_H$ in which a voltage of a positive polarity corresponding to the wave height value $-V_R$ applied during the reset term $T_R$ is retained, and after a printing operation has been completed. V1 is a DC voltage of a positive polarity applied in the retention period, and $V_J$ is a DC voltage of a positive polarity applied after the completion of a printing operation. The following relation is then established.

$$V_1 \cdot T_H + V_J \cdot T_C = V_R \cdot T_R \cdot (T_P/T_L)$$

Next, some definite embodiments of the present invention will be explained with reference to a printer using a plurality of optical switches. Incidentally, it is apparent to those skilled in the art that the present invention can be applied not only to a printer but also to optical shutters, displays and the like.

Figure 8:
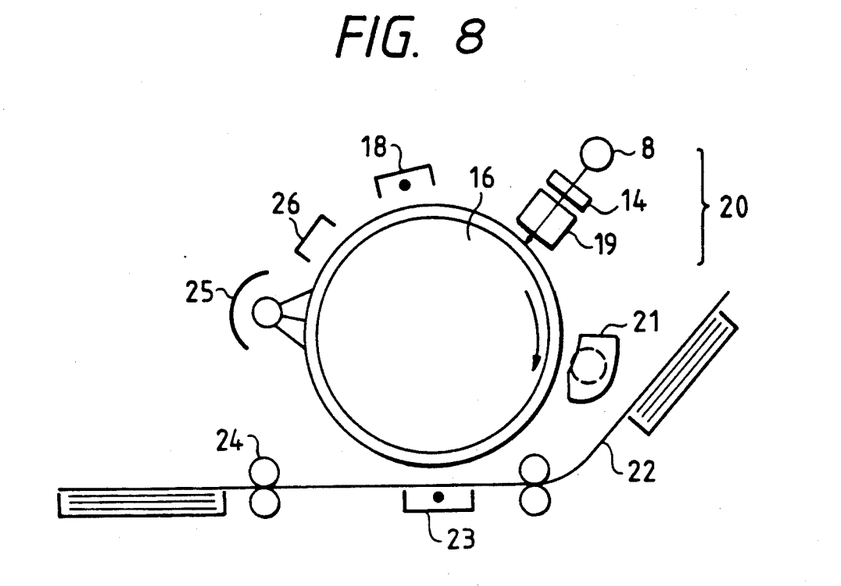
FIG. 8 is a diagram showing a printer to which the embodiment of the present invention is applied.

In FIG. 8, reference numeral 16 represents a movable photosensitive drum; 18 is a charger; 14 is a liquid crystal optical switch array panel having a plurality of optical switches; 19 is an optical image formation element; 20 is an optical print head; 21 is a developer; 22 is paper; 23 is a transfer device; 24 is a fixing device; 25 is an erase lamp; and 26 is a cleaner.

The action of the printer described above will now be explained. The photosensitive drum 16 is provided with uniform electrostatic charge by corona discharge of the charger 18. When light is selectively radiated to this drum 16 by the optical print head consisting of a light source 8 such as a fluorescent lamp, the liquid crystal optical switch array panel 14 and the optical image formation element 19, only the electrostatic charge of the zone to which the light is radiated is extinguished depending upon the properties of the photosensitive member, thereby forming an electrostatic latent image.

There are generally two types of development, a reversal development in which the latent image formed on the portion of the photosensitive member to which the light was radiated by the optical switch in the light transmitting condition is developed with toner, and a normal development in which latent image on the portion of the photosensitive member to which the light was not radiated is developed with toner and the toner image is formed. The present embodiment will now be described in the case of the reversal development. In the normal development, the light transmitting condition and light interrupting condition are reversed.

As the paper 22 fed from a cassette is sent to the transfer device 23, the toner image is transferred to the paper by the force of an electric field, and the toner image is further fixed to the paper by a pressure or heat or light flash from the fixing device 24, forming a permanent image.

Any residual charge and surface charge on the surface of the photosensitive drum 16 are removed by the erase lamp 25 and the cleaner 26, and the photosensitive member returns to its initial state.

Figure 9:
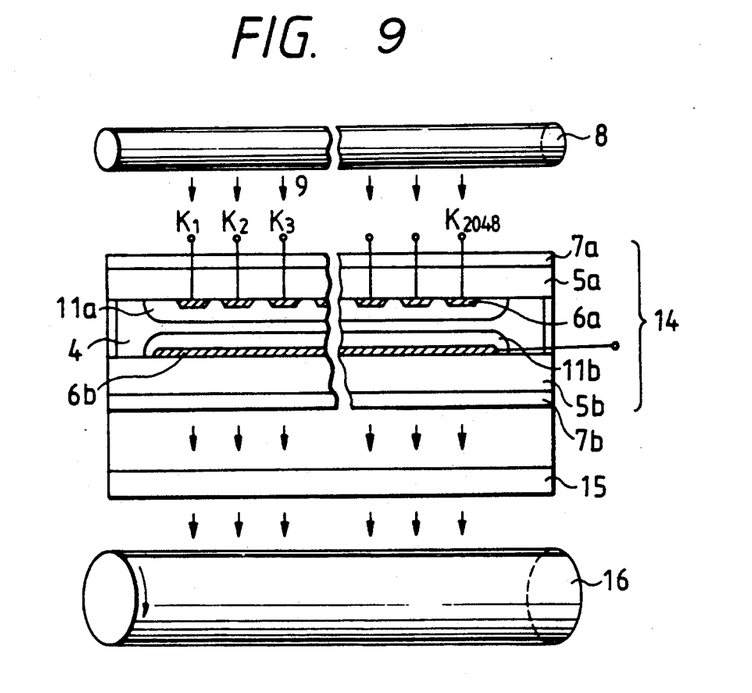
FIG. 9 is a diagram showing the construction of an optical switch in the printer of FIG. 8.

Next, FIG. 10 shows the structure of an optical switch element for a printer, which element uses a ferroelectric liquid crystal material 4. Orientation films 11a and 11b are formed on a fine signal electrode substrate 5a on which electrodes 6a for fine signals are formed (10 electrodes/mm and 2,048 electrodes in all), and on a common electrode substrate 5b on which a common electrode 6b is formed, respectively. An optical switch portion is disposed either two-dimensionally or in a two-dimensional array form, and the DOBAMBC liquid crystal 4 shown in U.S. Pat. No. 4,508,429, U.S. Pat. No. 4,591,806, U.S. Pat. No. 4,712,876 is then interposed in parallel between the substrates in a predetermined thickness (about 4 μm). The light 9 incident to the optical switch element 14 from the light source 8 is selectively passed therethrough by an electric field applied between the signal electrode terminal $K_1$-$K_{2048}$ of each electrode and the common electrode 6b, and is spot-radiated onto the surface of the photosensitive drum 16 by a convergent lens 15. In FIG. 10, reference numerals 7a, 7b represent polarizers.

Figure 4:
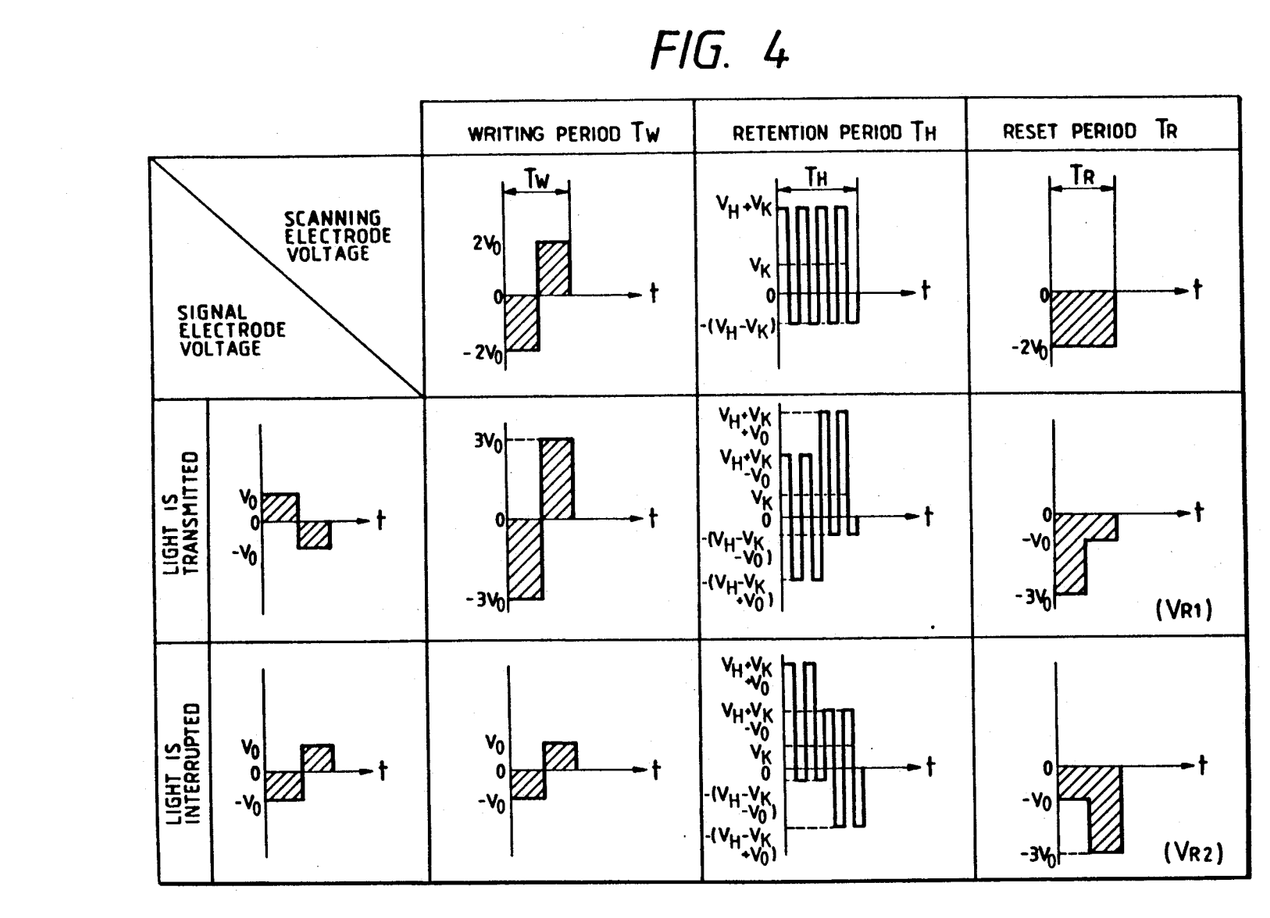
FIG. 4 shows waveforms of driving voltages in an embodiment of the present invention.

Embodiments of the present invention will now be described. FIG. 4 shows the waveforms of the driving voltage signals used in an embodiment of the present invention, in which the waveforms of the voltage signals at a scanning electrode and a signal electrode are set as shown in the drawing. The waveform of a voltage signal applied during the reset period of the scanning electrode is that of a DC voltage $-2V_0$ of a negative polarity constituting one polarity, and the waveform of a voltage applied to a liquid crystal layer during the reset period corresponds to a change of the waveform of a voltage signal at the signal electrode. In other words, it depends upon the light transmitting condition for printing and the light interrupting condition for non-printing and it is either $V_{R1}$ or $V_{R2}$, respectively, as shown in FIG. 4. Since neither of these waveforms include a DC voltage component of a positive polarity constituting the opposite polarity, the leakage of the light does not occur during the reset period $T_R$. Instead of this, a voltage signal having a DC component of a negative polarity $-2V_0 \cdot T_R$ is applied during the reset period $T_R$, and therefore, a voltage signal corresponding thereto, i.e., preferably a voltage signal having a DC component of a positive polarity $V_K = 2V_0 T_R / T_H$.

In this embodiment, a high-frequency AC voltage is applied in the retention period so as to stabilize the molecular orientation and improve the retaining effect. This is called a AC-field stabilizing effect and is advantageous where a liquid crystal material having negative dielectric anisotropy is used, and can prevent the bias voltage $V_K$ from rearranging the molecules. A method in which a high frequency AC voltage is not applied can also be used, of course. When a voltage is applied during the writing period Tw selecting the light interrupting condition in this embodiment, such a small voltage ($\pm V_0$) that does not disturb the condition selected in the rest period, is applied to retain the light interrupting condition, and, only when the light transmitting condition is selected, a reverse voltage $3V_0$ is applied in the writing period.

Figure 5:
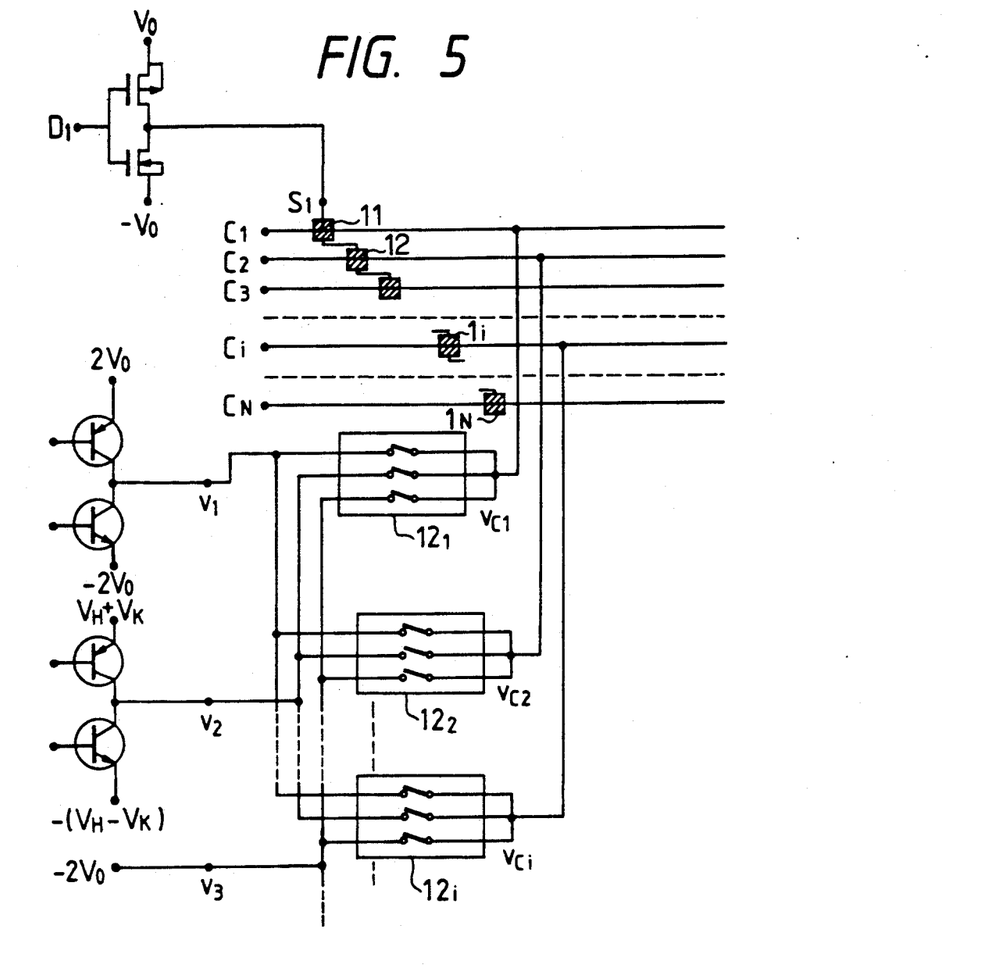
FIGS. 5 and 6 show a circuit for the driving method of FIG. 4 and the waveforms of voltages used therein.
Figure 6:
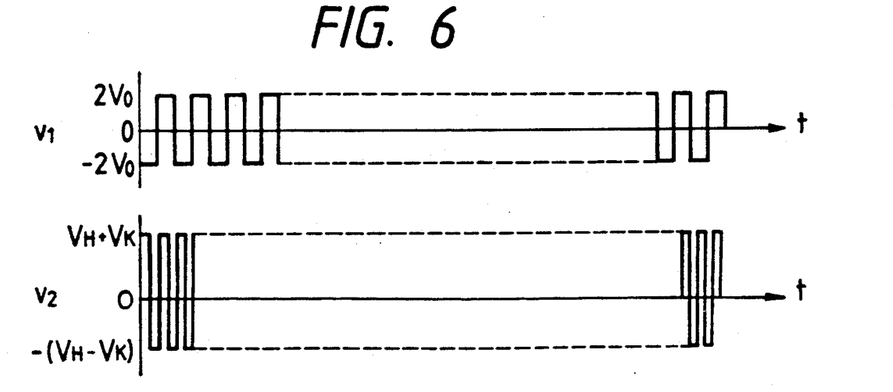

FIG. 5 shows a circuit for driving at least one optical switch by the driving voltages having waveforms shown in FIG. 4, the circuit being adapted to carry out the time sharing driving of a duty 1/N having N scanning electrodes $C_1$–$C_N$. A CMOS-IC driver is connected to a signal electrode $S_1$, and a voltage pulse $-V_0 + V_0$ or $+V_0 - V_0$ is applied thereto in accordance with a data signal $D_1$, which pulse forms the signal electrode voltage shown in FIG. 4. A voltage $V_1$ shown in FIG. 5 has an AC voltage waveform having a pulse width of $T_L/2N$ and a wave height or amplitude value of $2V_0$ as shown in FIG. 6, and a voltage $V_2$ is an alternating voltage having a frequency of 10–40 KHz and a bias voltage of $V_K$, a voltage $V_3$ being a DC voltage of $-2V_0$. These voltages $V_1$, $V_2$, $V_3$ are selected by multiplexers 121, 122 . . . and form the scanning electrode voltages shown in FIG. 4.

Figure 7:
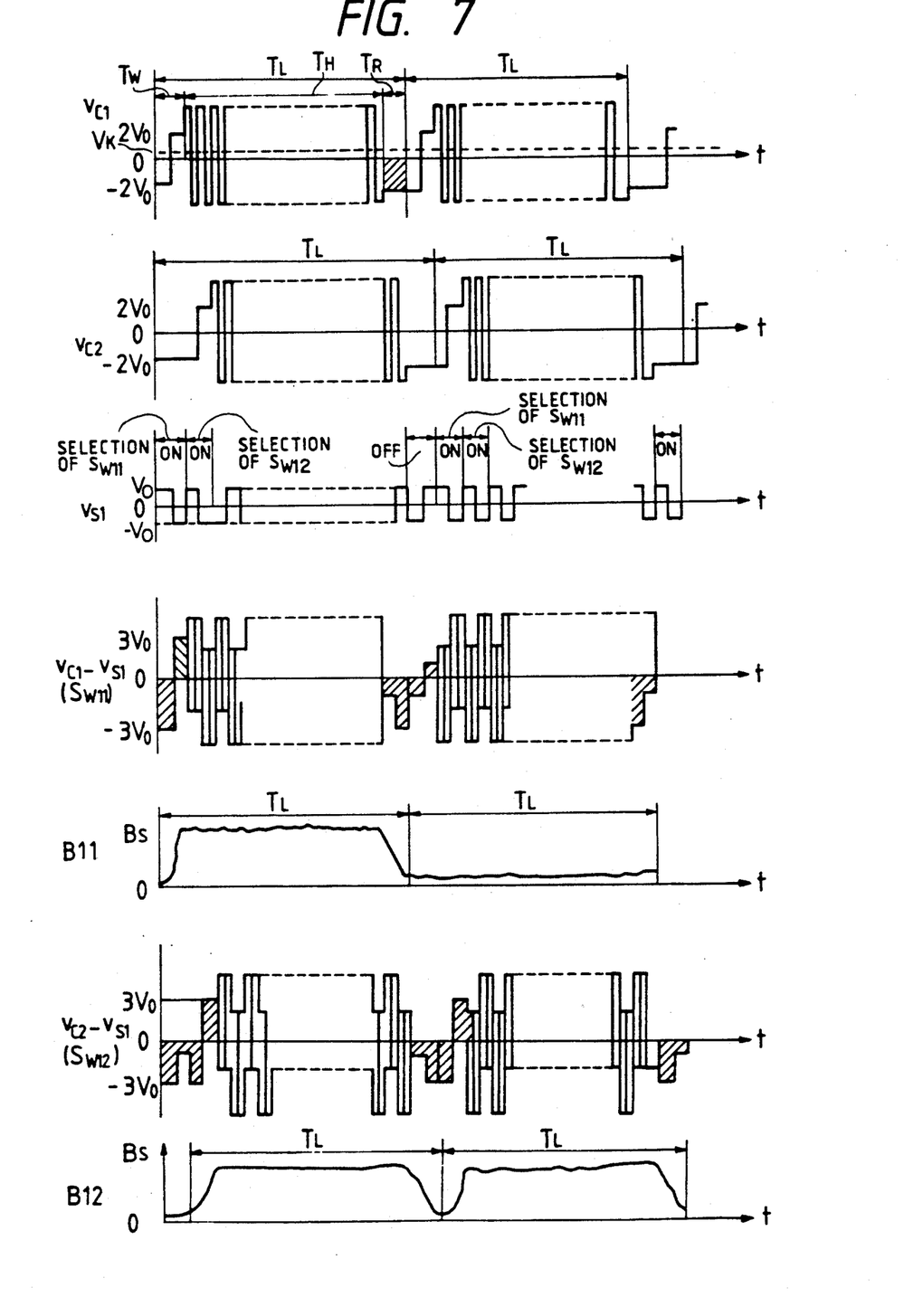
FIG. 7 shows waveforms of transmitted light, which are used to describe the effect of the present invention.

FIG. 7 shows the scanning voltage signals $V_{C1}$, $V_{C2}$ applied to the scanning electrodes $C_1$, $C_2$, a signal voltage signal $V_{S1}$ at the signal electrode $S_1$, the voltage signals applied to the liquid crystal layers of the optical switches 11, 12 at the intersections of $V_{S1}$ and $V_{C1}$, $V_{C2}$, and examples of the waveforms of light transmission amount B11, B12. The phases of $V_{C1}$, $V_{C2}$ are staggered by $T_L/N$. Since a DC voltage of a negative polarity is applied during the reset period $T_R$, the last part of the period $T_L$ of one line is put in complete light interrupting condition for non-printing. A voltage signal having a DC component $V_K$ of a positive polarity is applied continuously in the retention period $T_H$, and a high-frequency AC voltage signal as superposed thereon. Accordingly, when the light interrupting condition is selected, it is retained excellently owing to the high-frequency stabilizing effect even if the liquid crystal element does not have a bistable memory effect. If the liquid crystal element has a bistable memory effect, the high-frequency voltage is not necessary.

As may be understood from a comparison between the waveform B11 shown in FIG. 7 of the transmitted light in the optical switch 11 and that OFF(A) shown in FIG. 2b of transmitted light, the light transmission amount during an entire OFF period in the present invention is very low. The light transmission amount during an ON period in the present invention is always substantially the same both when the ON period continues from an ON period and the ON period continues from an OFF period. Consequently, the contrast becomes very high, and the same contrast can always be obtained irrespective of the pattern of a printing signal.

According to the present invention, the light transmission amount in an OFF period can be minimized, and that in an ON period can always be set substantially equal. Moreover, the average DC component applied to the liquid crystal layer can be reduced. This enables a highly reliable optical switch driving method having a high and substantially invariable contrast provided by at least one optical switch to be obtained for printing purposes.

What is claimed is:

1. A method for driving an optical printer having at least one liquid crystal optical switch including a ferroelectric liquid crystal layer interposed between a pair of substrates having electrodes on confronting surfaces thereof, the at least one liquid crystal switch being disposed between light source means and a photosensitive surface, a light transmission state of the at least one liquid crystal optical switch being controlled by application of a voltage signal to the at least one liquid crystal optical switch so as to control light transmission to the photosensitive surface, comprising the steps of:
    applying a first voltage signal to the liquid crystal layer of the at least one optical switch in a writing period in which the light transmission state is determined in accordance with a printing signal for printing;
    applying a second voltage signal having a DC component of one polarity to the liquid crystal layer of the at least one optical switch in a retention period;
    applying a third voltage signal having a DC component of an opposite polarity to the liquid crystal layer of the at least one optical switch in a reset period in which the at least one liquid crystal optical switch is placed in a light interrupting state; and
    applying a fourth voltage signal having a DC component of the one polarity to the liquid crystal layer of the at least one optical switch in a period other than an excluding period which is formed from the writing period, retention period and reset period.

2. A method according to claim 1, wherein the step of applying the third voltage signal enables a light transmission amount in the reset period to be minimized while enabling the light transmission amount in a period of printing to be set substantially equal thereby enabling a high and substantially invariable contrast ratio for printing with the at least one liquid crystal optical switch to be obtained.

3. A method according to claim 1, wherein the steps of applying the second and fourth voltage signals enables a reduction in the average DC component applied to the liquid crystal layer of the at least one optical switch.

4. A method according to claim 3, wherein in the retention period, the light transmission state determined by the first voltage signal applied to liquid crystal layer in the writing period is substantially retained.

5. A method according to claim 3, wherein the fourth signal voltage is applied to the liquid crystal layer of the optical switch at least one of before and after the printing.

6. A method according to claim 5, further comprising affecting printing on sheets of paper, the period in which the fourth voltage signal is applied to the liquid crystal layer of the optical switch being provided after completion of the printing of at least one sheet of paper.

7. A method according to claim 3, wherein the period other than the excluding period includes a period of at least one of before and after the printing.

8. A method according to claim 3, wherein the application of the second and fourth voltage signals enables a reduction of the average DC component of the voltage signals applied to the liquid crystal layer to be substantially zero volts.

9. A method according to claim 3, wherein the second voltage signals includes a constant voltage portion.

10. A method according to claim 9, wherein the ferroelectric liquid crystal has a negative dielectric anisotropy, and the second voltage signal further includes an alternating voltage portion of a high frequency sufficient to prevent liquid crystal molecules of the liquid crystal optical switch from substantially responding to a variation of polarity of the alternating voltage portion.

11. A method according to claim 3, wherein the photosensitive surface is a movable photosensitive surface and further comprising the step of moving the photosensitive surface to enable printing of a medium to be printed.

12. An apparatus for driving an optical printer comprising:
light source means;
photosensitive means;
at least one liquid crystal switch including a ferroelectric liquid crystal layer interposed between a pair of substrates having electrodes on confronting surfaces thereof, the at least one liquid crystal optical switch being disposed between the light source means and a surface of the photosensitive means so as to control light transmission onto the surface of the photosensitive mean;
means for applying a first voltage signal to the liquid crystal layer of at least one optical switch in a writing period in which the light transmission state is determined in accordance with a printing signal for printing;
means for applying a second voltage signal having a DC component of one polarity to the liquid crystal layer of the at least one optical switch in a retention period;
means for applying a third voltage signal having a DC component of an opposite polarity to the liquid crystal layer of the at least one optical switch in a reset period in which the at least one liquid crystal optical switch is placed in the light interrupting state; and
means for applying a fourth voltage signal having a DC component of the one polarity to the at least one liquid crystal layer of the at least one optical switch in a period other than an excluding period which is formed of the writing period, retention period and reset period 13. An apparatus according to claim 12, wherein the means for applying a third voltage signal enables a light transmission amount in a period of non-printing to be minimized while enabling the light transmission amount in a period of printing to be set substantially equal thereby enabling a high and substantially invariable contrast for printing with the at least one liquid crystal optical switch to be obtained.

14. An apparatus according to claim 12, wherein the means for applying the second and fourth voltage signal reduces the DC component included in the average value of voltage signals applied o the liquid crystal layer of the at least one optical switch.

15. An apparatus according to claim 14, wherein the period other than the reset period includes a retention period in which the light transmitting condition determined by the application of the first voltage signal in the write-in period is substantially retained.

16. An apparatus according to claim 14, wherein the fourth voltage signal is applied to the liquid crystal layer of the at least one optical switch, at least one of before and after the printing.

17. An apparatus according to claim 16, wherein printing is affected on sheets of paper, and wherein the fourth voltage signal is applied to the liquid crystal layer of the at least one optical switch after completion of printing of at least one sheet of paper.

18. An apparatus according to claim 14, wherein the period other than the excluding period includes a period of at least one of before and after the printing.

19. An apparatus according to claim 14, wherein the application of the second voltage signal and the fourth voltage signal enables a reduction of the average DC component of the voltage signals applied to the liquid crystal layer to be substantially zero volts.

20. An apparatus according to claim 14, wherein the means for applying the second voltage signal provides the second voltage signal with a constant voltage portion.

21. An apparatus according to claim 20, wherein the ferroelectric liquid crystal has a negative dielectric anisotropy, and the means for applying the second voltage signal further provides the second voltage signal with an alternating voltage portion of a high frequency sufficient to prevent liquid crystal molecules of the liquid crystal optical switch from substantially responding to a variation of polarity of the alternating voltage portion.

22. An apparatus according to claim 14, wherein the photosensitive surface is a movable photosensitive surface and further comprising means for moving the photosensitive surface to enable printing of a medium to be printed.

* * * * *